(12) United States Patent
Beer et al.

(10) Patent No.: US 7,681,082 B2
(45) Date of Patent: Mar. 16, 2010

(54) METHOD AND APPARATUS FOR IMPROVED ERROR AVOIDANCE IN A REDUNDANT DATA PATH SYSTEM

(75) Inventors: Reginald Beer, Eastleigh (GB); Peter John Deacon, Wimbourne (GB); Hamish Birrell Williamson Halley, Petersfield (GB)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 10/920,864

(22) Filed: Aug. 18, 2004

(65) Prior Publication Data

US 2006/0039289 A1 Feb. 23, 2006

(30) Foreign Application Priority Data

Aug. 30, 2003 (GB) .................................. 0320388.2

(51) Int. Cl.
*G06F 11/00* (2006.01)
(52) U.S. Cl. ..................... 714/43; 710/302; 711/114
(58) Field of Classification Search .................. 714/43; 710/302; 711/114
See application file for complete search history.

(56) References Cited

U.S. PATENT DOCUMENTS

| | | | |
|---|---|---|---|
| 5,890,214 A * | 3/1999 | Espy et al. .................. 711/114 |
| 6,351,831 B1 * | 2/2002 | Sawdy et al. ................... 714/48 |
| 6,430,714 B1 | 8/2002 | McAdam et al. ............. 714/704 |
| 6,480,934 B1 * | 11/2002 | Hino et al. ................... 711/114 |
| 6,809,505 B2 * | 10/2004 | Peeke et al. .................... 324/66 |
| 7,177,991 B2 * | 2/2007 | Yamamoto et al. ........... 711/161 |
| 7,216,192 B2 * | 5/2007 | Boulay et al. ................ 710/302 |
| 7,346,721 B2 * | 3/2008 | Ikeda .......................... 710/302 |
| 2006/0146698 A1 * | 7/2006 | Ukrainetz et al. ............ 370/221 |
| 2007/0140130 A1 * | 6/2007 | Valdes et al. ................. 370/241 |

* cited by examiner

*Primary Examiner*—Robert Beausoliel
*Assistant Examiner*—Philip Guyton
(74) *Attorney, Agent, or Firm*—Kunzler & McKenzie (57) ABSTRACT

A logic arrangement, method and computer program for reducing incidence of errors in a redundant path system during a process of attachment of a device to a running subsystem, comprises a control component for encapsulating the process of attachment of a device to a running subsystem; a disabling component for disabling a path interface; a testing component for testing for the presence of a usable data path across at least one further path interface; and an enabling component for enabling the at least one further path interface to accept communication with the device responsive to a positive outcome from the testing component; wherein the control component is adapted to permit operation after attachment of the device only if full redundancy is retained. A re-enabling component may re-enable any path interface or further path interface.

34 Claims, 3 Drawing Sheets

METHOD AND APPARATUS FOR IMPROVED ERROR AVOIDANCE IN A REDUNDANT DATA PATH SYSTEM

BACKGROUND OF THE INVENTION

1. Field of the Invention

This invention relates to a method and apparatus for improving reliability of networked subsystems. In particular, the invention relates to improved error avoidance in redundant data path subsystems, such as dual-loop Fibre Channel Arbitrated Loops. The invention could equally apply to other redundant data path subsystems.

2. Description of the Related Art

For brevity and clarity, the invention and its preferred embodiments will be described against a background of the Fibre Channel Arbitrated Loop architecture, but it will be clear to one skilled in the art that they are not limited to use in such an environment. In particular, it will be readily apparent to one skilled in the art that many other redundant data path subsystems exist in the field of data processing, and that the systems and methods of the present disclosure would have equal applicability in those subsystems.

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is well-known to those skilled in the art, and need not be described in great detail herein.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

Devices are connected to a FC-AL using hardware which is termed a "port." A device which has connections for two loops has two ports or is "dual-ported."

In one embodiment, the operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is retransmitted. This buffer exists to deal with slight clocking variations that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop. There exist also well-known alternative embodiments, such as those using Fibre Channel switches instead of FC-bypassable transceivers.

FC-AL architecture may be in the form of a single loop. Often two independent loops are used to connect the same devices in the form of dual loops. The aim of these loops is to provide an alternative path to devices on a loop should one loop fail. A single fault should not cause both loops to fail simultaneously. More than two loops can also be used.

FC-AL devices typically have two ports allowing them to be attached to two FC-ALs. Thus, in a typical configuration, two independent loops exist and each device is physically connected to both loops. When the system is working optimally, there are two possible loops that can be used to access any dual-ported device.

A FC-AL can incorporate bypass circuits with the aim of making the FC-AL interface sufficiently robust to permit devices to be removed from the loop without interrupting throughput and sacrificing data integrity. If a disk drive fails, port bypass circuits attempt to route around the problem so all the other disk drives on the loop remain accessible. Without port bypass circuits a fault in any device will break the loop.

In dual loops, port bypass circuits are provided for each loop and these provide additional protection against faults. A device can be bypassed on one loop while remaining active on the dual loop.

A typical FC-AL may have one or two host bus adapters (HBA) and a set of six or so disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

An SES device is an example of an enclosure service device which manages a disk enclosure and allows the monitoring of power and cooling in an enclosure. The SES device also obtains information as to which slots in an enclosure are occupied. The SES device accepts a limited set of SCSI commands. SCSI Enclosure Services are well-known to those skilled in the art and need not be described further here.

SES devices may be dedicated SES nodes on the loop or there may be a disk drive that also supports ESI communication to the enclosure processor. For the purposes of this disclosure, either type of device will be referred to as an SES device.

Having described the general background of the invention, a more detailed description of some particular problems typically frequently encountered by users of redundant data path subsystems.

In subsystems such as FC-AL that contain redundant data paths, when it is necessary to add another enclosure concurrently with normal subsystem operations, there is always a possibility that the new enclosure that is being added has an internal failure. If such an enclosure is attached, both of the interfaces might be disabled or rendered dysfunctional when the new enclosure is connected to the existing, functioning subsystem. The points of failure may lie in the existing subsystem's interfaces, or in the newly-attached enclosure's interfaces.

It is known in the art, for example, from U.S. Pat. No. 5,890,214, to address a similar problem by requesting, over a separate (non data-path) channel, that a device return its own status. However, this only allows the device to return the status of which it is "aware", which may be incorrect. Also, the status of the interfaces is not thereby tested, as a completely separate communications channel has been used to request and receive the status.

It would therefore be desirable to enable the automation of the attaching and checking process and to offer protection against the problems described, as well as reducing the potential for human error, without adding extra devices or channels.

SUMMARY OF THE INVENTION

According to a first aspect of the present invention there is provided a logic arrangement for reducing incidence of errors in a redundant path system during a process of attachment of a device to a running subsystem, comprising: a control component for encapsulating said process of attachment of a device to a running subsystem; a disabling component for disabling a path interface; a testing component for testing for the presence of a usable data path across at least one further path interface; and an enabling component for enabling said at least one further path interface to accept communication with said device responsive to a positive outcome from said testing component; wherein said control component is adapted to permit operation after attachment of said device only if full redundancy is retained.

The logic arrangement preferably further comprises a re-enabling component for re-enabling any said path interface or further path interface.

The logic arrangement preferably further comprises an operator warning component to warn an operator that an expansion of said usable data path cannot be successful responsive to a negative result from said testing component.

The logic arrangement preferably further comprises a termination component for terminating said attachment process responsive to a negative result from said testing component.

Preferably said redundant path system comprises a plural loop system.

Preferably said redundant path system comprises a dual loop FC-AL system.

Preferably said redundant path system comprises a storage subsystem.

Preferably said redundant path system comprises a storage controller subsystem.

In a second aspect of the present invention, there is provided a method for reducing incidence of errors in a redundant path system during a process of attachment of a device to a running subsystem, comprising the steps of: encapsulating, by a control component, said process of attachment of a device to a running subsystem; disabling a path interface; testing for the presence of a usable data path across at least one further path interface; and enabling said at least one further path interface to accept communication with said device responsive to a positive outcome from said testing; wherein said control component is adapted to permit operation after attachment of said device only if full redundancy is retained.

The method preferably further comprises the step of re-enabling any said path interface or further path interface.

The method preferably further comprises the step of warning an operator that an expansion of said usable data path cannot be successful responsive to a negative result from said step of testing.

The method preferably further comprises the step of terminating an attachment process responsive to a negative result from said step of testing.

Preferably, said redundant path system comprises a plural loop system.

Preferably said redundant path system comprises a dual loop FC-AL system.

Preferably said redundant path system comprises a storage subsystem.

Preferably, said redundant path system comprises a storage controller subsystem.

In a third aspect, the present invention provides a computer program comprising computer program code to, when loaded into a computer system and executed thereon, cause said computer system to perform all the steps of a method according to the second aspect.

One of the advantages in using the automated approach of the preferred embodiment of the present invention is that there is less likelihood of a defective enclosure being added to a subsystem and resulting in loss of access to existing data. The preferred embodiment of the present invention also advantageously alleviates the problem of errors caused by a subsystem operator mis-plugging cables.

BRIEF DESCRIPTION OF THE DRAWINGS

Embodiments of the invention are now described, by means of examples only, with reference to the accompanying drawings in which.

DETAILED DESCRIPTION OF THE PREFERRED EMBODIMENT

A loop network system with a plurality of serially connected ports in the form of a Fibre Channel Arbitrated Loop (FC-AL) is described for connecting together computer peripherals, in particular disk drives. The described embodiments are given in the context of FC-AL architecture although the described method and apparatus could be applied to any redundant data path loop network.

Figure 1:
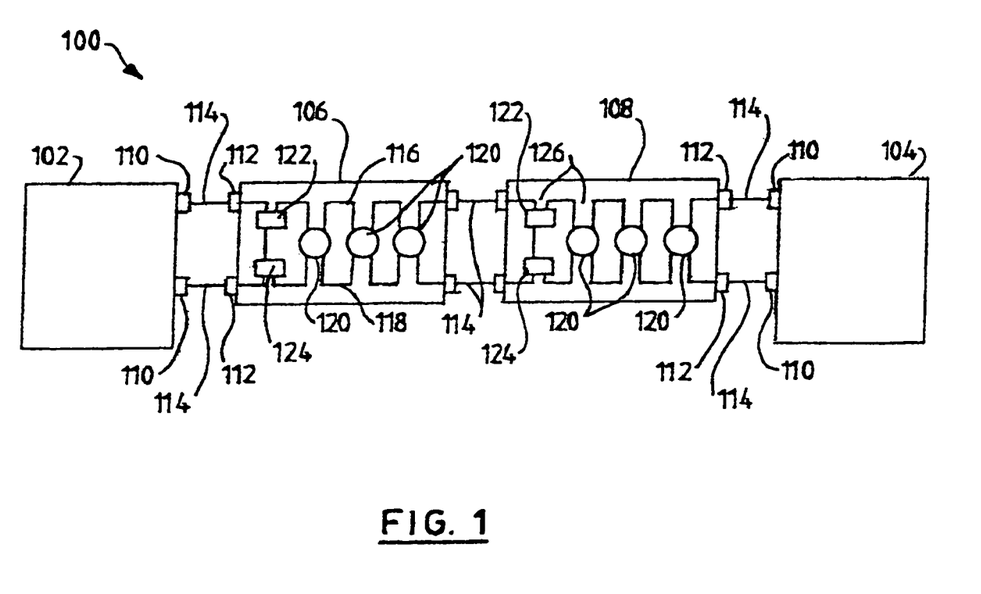
FIG. 1 is a diagram of a conventional dual loop network in which the teaching of the present invention may be practised.

Referring to FIG. 1, an exemplary loop network 100 is shown in the form of a Fibre Channel Arbitrated Loop with two host bus adapters 102, 104. FIG. 1 shows one form of a loop network on which the present invention may be practised.

The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram. The loops 116, 118 comprise all their respective elements connected together between adapter 102 on the left of FIG. 1 and adapter 104 on the right of FIG. 1. Thus, loops 116, 118 can be seen to incorporate all the communicating elements of adapters, cables, connectors, enclosures, and so forth, as described in grater detail below.

The adapters 102, 104 have external connectors 110 for cables 114 connecting each loop 116, 118 from the adapters 102, 104 to external connectors 112 of the enclosures 106, 108. Cables 114 also connect the two enclosures 106, 108 such that each loop 116, 118 passes from one enclosure 106 to the next enclosure 108.

Each loop 116, 118 passes from the first adapter 102 via an adapter external connector 110, a cable 114 and an enclosure external connector 112 to the first enclosure 106. In the first enclosure 106 of the exemplary loop network 100, each loop 116, 118 passes through its own SES (SCSI Enclosure Services) device or controller 122, 124 and then through each of the disk drives 120 in turn. The two loops 116, 118 both pass through the same shared disk drives 120. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an SES device 122, 124. All devices in the loop 100, including host bus adapters 102, 104, disk drives 120 and any enclosure controllers 122, 124 have hardware connections to a loop 106, 108 referred to as ports. Each port has a receiver and a transmitter. The ports are connected such that each port's transmitter is connected to the next port's receiver, and so on, forming the loop 106, 108. Each port's receiver has an elasticity buffer that captures the incoming FC-AL frame and is then used to regenerate the FC-AL frame as it is retransmitted.

The disk drives 120 are examples of dual port devices in that they are common to both the loops 116, 118 of the loop network 100.

An SES device 122, 124 is provided on each loop 116, 118 in each enclosure and the two SES devices 122, 124 are connected together through the enclosure's backplane. One SES device can be used to control the other SES device. An SES device manages an enclosure and provides a point of control for each enclosure. It can monitor parameters such as power and cooling and obtain information as to which slots for disk drives are occupied. It accepts a limited set of SCSI commands.

The SES devices 122, 124 shown in FIG. 1 are provided as nodes in the loops 116, 118. These are referred to as "in loop" SES devices.

SES devices can also be provided by means of an Enclosure Services Interface (ESI) in which case the SES devices are not in the loop but are interfaced from one or more disk drives. SES devices of this nature are usually provided on a few disk drives in each enclosure. Commands can be sent to the SES device in an enclosure via the disk drive with the ESI.

The enclosures that make up the original subsystem support the ability to enable and disable their external connections under command control from the Host System. An example of this would be by using SCSI-3 SCSI Enclosure Services. In alternative embodiments, as will be clear to one skilled in the art, other commands or control signals may be used.

Figure 2A:
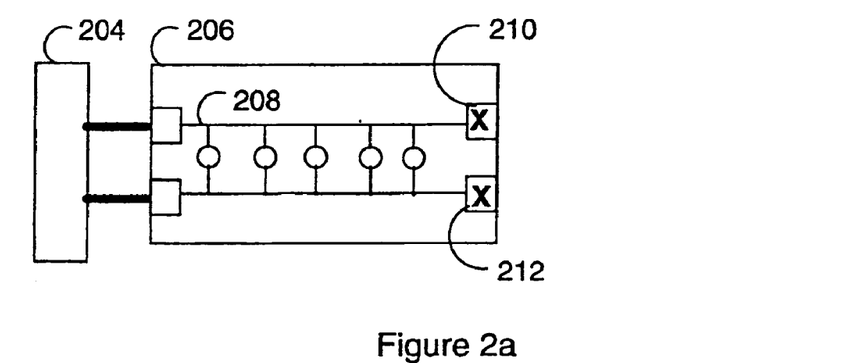
FIG. 2a is a diagram of one state of an existing subsystem according to a preferred embodiment of the present invention.
Figure 2B:
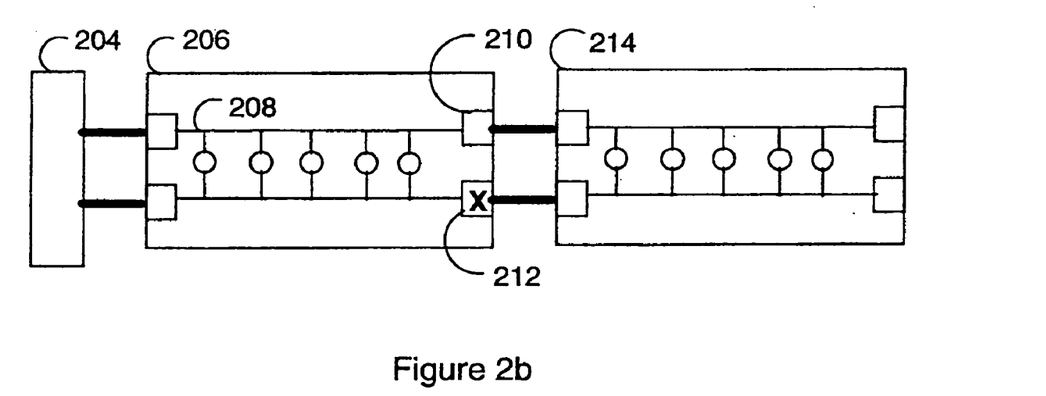
FIG. 2b is a diagram of a further state of an existing subsystem according to a preferred embodiment of the present invention.
Figure 2C:
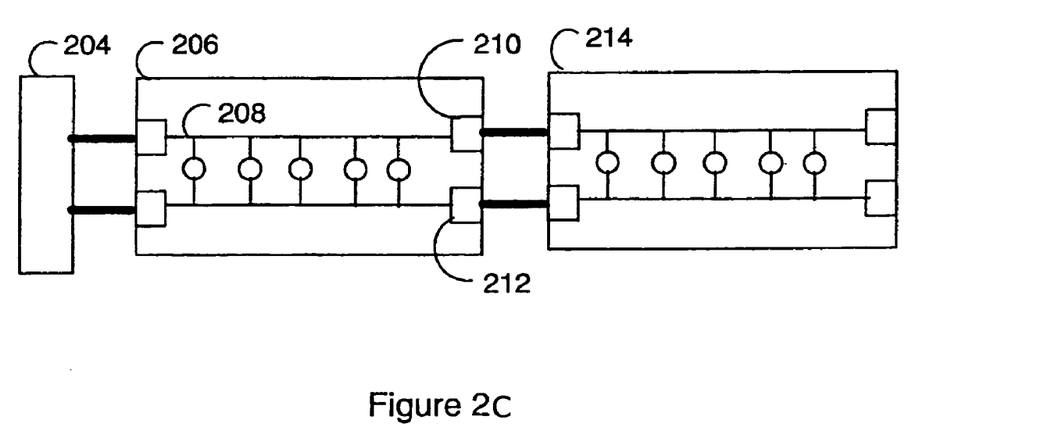
FIG. 2c is a diagram of a yet further state of an existing subsystem according to a preferred embodiment of the present invention.
Figure 3:
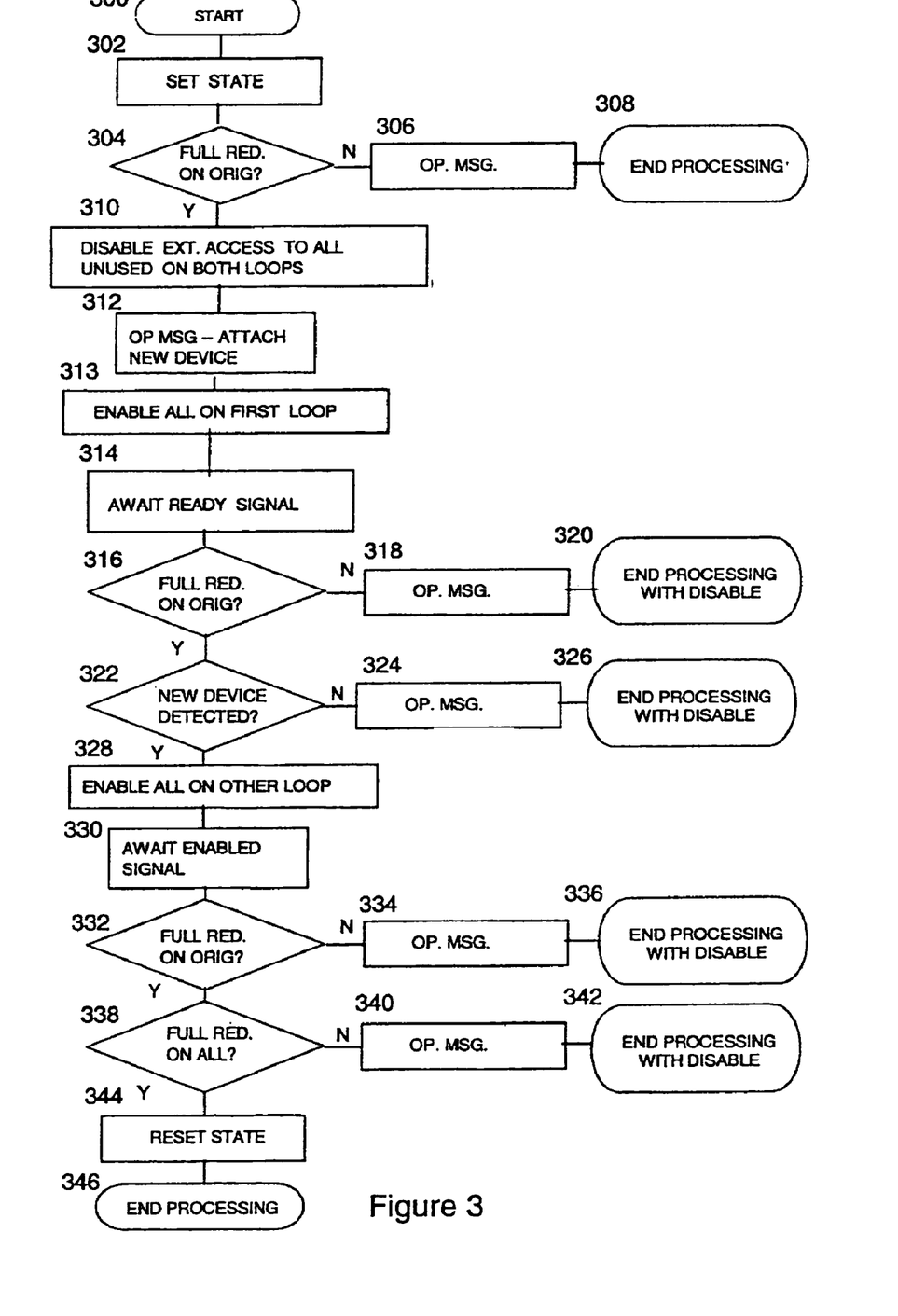
FIG. 3 is a flow diagram of a method in accordance with a preferred embodiment of the present invention.

FIG. 3 shows the method steps by which the Host System control component performs a reduced-error addition of an enclosure to a subsystem which is in normal operation. FIGS. 2a, 2b and 2c show various states of the existing and new enclosures, and are referred to as necessary in the description of the method shown in FIG. 3.

In FIGS. 2a, 2b and 2c are shown:
a host system 204;
a first enclosure 206 representing the accessible interface of an existing subsystem;
a device 208 (representing all similarly depicted devices in the figures);
a first interface 210;
a second interface 212; and
a second enclosure 214.

Turning now to FIG. 3, there are shown the steps of a method according to a preferred embodiment of the present invention.

The method starts 300, and at step 302, the subsystem is placed in an 'Adding New Enclosure' state.

At step 304, a check is performed to ensure that that both interfaces in the existing subsystem can access all the attached devices on both their interfaces (thus checking that full redundancy is in operation).

If any of the checks returns a negative response, an error to the operator is generated at step 306 to indicate that there is a problem in the existing subsystem that needs to be fixed before the new enclosure can be safely added to the existing subsystem. The procedure is stopped at step 308 to await this intervention.

If all the checks return positive outcomes, at step 310 all the interface connections on both of the loops that are detected as indicating that they are not being used are disabled. FIG. 2a shows this state of the existing subsystem 206. In an exemplary embodiment using FC-AL this could be achieved using 'Loss-of-Link' (LOL). In other environments, an equivalent command or signal may be used. This ensures that only one interface is logically attached initially (for example, interface 210 or 212).

At step 312, a message is issued to the operator to ensure that the new enclosure is Powered-On and to connect it to the subsystem at the selected point in the network (For the resulting state, see FIG. 2b). The connection might be effected at the end of the existing loop or at some intermediate point where existing enclosures have more than two pairs of external connections.

At step 313, all connectors on one of the loops are enabled.

At step 314, the subsystems wait for sufficient time for the one enabled interface 210 to configure and become 'Ready'.

At step 316, a check is performed to ensure that all the original devices, as found in step 304, can still be accessed on both interfaces. (This indicates that adding the connections has not impacted the existing subsystem).

If the check returns a negative response, an error to the operator is generated at step 318 to indicate that there is a problem in the existing subsystem that needs to be fixed before the new enclosure can be safely added to the existing subsystem. The procedure is stopped at step 320 to await this intervention. To preserve full redundancy on the original subsystem, all the interface connections on both loops that are detected as indicating that they are not in use are disabled (as in step 310 above).

At step 322, a check is performed to ensure that at least one new device has been detected.

If the check returns a negative response, an error to the operator is generated at step 324 to indicate that there is a problem that needs to be fixed before the new enclosure can be safely added to the existing subsystem. The procedure is stopped at step 326 to await this intervention. To preserve full redundancy on the original subsystem, all the interface connections on both loops that are detected as indicating that they are not in use are disabled (as in step 310 above).

If the response is positive, at step 328, the interface connection (interface 212) that was disabled in step 310 is enabled. The resulting state is shown in FIG. 2c.

At step 330, the subsystems wait for sufficient time for the newly-enabled interface 212 to configure and become 'Ready'.

At step 332, a check is performed to ensure that all the original devices, as found in step 304, can still be accessed on both interfaces. (This indicates that adding the connections has not impacted the existing subsystem).

If any of the checks returns a negative response, an error to the operator is generated at step 334 to indicate that there is a problem that needs to be fixed before the new enclosure can be safely added to the existing subsystem. The procedure is stopped at step 336 to await this intervention. To preserve full redundancy on the original subsystem, all the interface connections on both loops that are detected as indicating that they are not in use are disabled (as in step 310 above).

At step 338, a check is performed to ensure that all devices now attached to the subsystem, both those previously existing and those that have been newly attached, can be accessed on both interfaces.

If the check returns a negative response, an error to the operator is generated at step 340 to indicate that there is a problem in the existing subsystem that needs to be fixed before the new enclosure can be safely added to the existing subsystem. The procedure is stopped at step 342 to await this intervention. To preserve full redundancy on the original subsystem, all the interface connections on both loops that are detected as indicating that they are not in use are disabled (as in step 310 above).

If the response to this check is positive, at step 344, the subsystem exits the 'Adding New Enclosure' state and the method ends processing 346.

The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

However, the method is also suitable to be embodied in a logic arrangement permanently or temporarily established in a hardware apparatus in the form of firmware elements or logic elements of an ASIC.

Improvements and modifications can be made to the foregoing without departing from the scope of the present invention.

What is claimed is:

1. A system for reducing incidence of errors in a redundant path system during a process of attachment of an enclosure to a running subsystem, comprising:

a control component for encapsulating said process of attachment of said enclosure to said running subsystem via a first loop comprising a first fibre channel arbitrated loop (FC-AL) cable connected between a first FC-AL interface connection of said enclosure and a first FC-AL interface connection of said subsystem and a second loop comprising a second FC-AL cable connected between a second FC-AL interface connection of said enclosure and a second FC-AL interface connection of said subsystem;

a disabling component for disabling said first interface connection of said subsystem and said second interface connection of said subsystem as unused connections;

a re-enabling component enabling said first interface connection of said subsystem;

a testing component for testing for the presence of a usable data path across said first interface connection of said subsystem to said enclosure;

said re-enabling component re-enabling said second interface connection of said subsystem;

said testing component testing for the presence of a usable data path across said first interface connection and said second interface connection of said subsystem to said enclosure; and an enabling component enabling said first interface connection and said second interface connection of said subsystem to accept communication with said enclosure responsive to a positive outcome from said testing component, wherein said control component permits operation after attachment of said enclosure only if full redundancy is retained.

2. The system as claimed in claim 1, further comprising an operator warning component to warn an operator that an expansion of said usable data path cannot be successful responsive to a negative result from said testing component.

3. The system as claimed in claim 1, further comprising a termination component for terminating said attachment process responsive to a negative result from said testing component.

4. The system of claim 1, said enclosure comprising at least one device and said testing component further testing that said at least one device of said enclosure can be accessed through said first loop and said second loop.

5. The system of claim 4, said testing component checking that said at least one device of said enclosure is detected.

6. The system as claimed in claim 4 wherein each device of said enclosure and each device of said subsystem is a disk drive and said first and second interface connections of said subsystem are FC-AL interface connections of a last device.

7. The system as claimed in claim 6 wherein said subsystem and said enclosure each comprises first and second controllers and said first and second interface connections of said enclosure are FC-AL interface connection of the first and second controllers of said enclosure.

8. A host bus adaptor configured to reduce incidence of errors in a redundant path system during a process of attachment of an enclosure to a running subsystem, said host bus adaptor comprising:

a control component for encapsulating said process of attachment of said enclosure to said running subsystem via a first loop comprising a first FC-AL cable connected between a first FC-AL interface connection of said enclosure and a first FC-AL interface connection of said subsystem and a second loop comprising a second FC-AL cable connected between a second FC-AL interface connection of said enclosure and a second FC-AL interface connection of said subsystem;

a disabling component for disabling said first interface connection of said subsystem and said second interface connection of said subsystem as unused connections;

a re-enabling component enabling said first interface connection of said subsystem;

a testing component for testing for the presence of a usable data path across said first interface connection of said subsystem to said enclosure;

said re-enabling component re-enabling said second interface connection of said subsystem;

said testing component testing for the presence of a usable data path across said first interface connection and said second interface connection of said subsystem to said enclosure;

an enabling component enabling said first interface connection and said second interface connection of said subsystem to accept communication with said enclosure responsive to a positive outcome from said testing component, wherein said control component permits operation after attachment of said enclosure only if full redundancy is retained.

9. The host bus adaptor of claim 8, further comprising an operator warning warning component to warn an operator that an expansion of said usable data path cannot be successful, responsive to a negative result from said testing component.

10. The host bus adaptor of claim 8, further comprising a termination component for terminating said attachment process responsive to a negative result from said testing component.

11. The host bus adapter of claim 8, said enclosure comprising at least one device and said testing component further testing that said at least one device of said subsystem can be accessed through said first loop and said second loop and said testing component further checking that said at least one device of said enclosure is detected.

12. The host bus adaptor of claim 11, wherein each device of said enclosure and each device of said subsystem is a disk drive and said first and second interface connections of said subsystem are FC-AL interface connections of a last device, and said subsystem and said enclosure each comprises first and second controllers and said first and second interface connections of said enclosure are FC-AL interface connections of the first and second controllers of the enclosure.

13. An enclosure for reducing incidence of errors in a redundant path system during a process of attachment of said enclosure to a running subsystem, said enclosure comprising:

a control component for encapsulating said process of attachment of said enclosure to said running subsystem via a first loop comprising a first FC-AL cable connected between a first FC-AL interface connection of said enclosure and a first FC-AL interface connection of said subsystem and a second loop comprising a second FC-AL cable connected between a second FC-AL interface connection of said enclosure and a second FC-AL interface connection of said subsystem;

a disabling component for disabling said first interface connection of said subsystem and said second interface connection of said subsystem as unused connections;

a re-enabling component enabling said first interface connection of said subsystem;

a testing component for testing for the presence of a usable data path across said first interface connection of said subsystem to said enclosure;

said re-enabling component re-enabling said second interface connection of said subsystem;

said testing component testing for the presence of a usable data path across said first interface connection and said second interface connection of said subsystem to said enclosure;

an enabling component for enabling said first interface connection and said second interface connection of said subsystem to accept communication with said enclosure responsive to a positive outcome from said testing component, component, wherein said control component permits operation after attachment of said enclosure only if full redundancy is retained;

an operator warning component to warn an operator that an expansion of said usable data path cannot be successful responsive to a negative result from said testing component; and a termination component for terminating said attachment process responsive to a negative result from said testing component.

14. The enclosure of claim 13, said enclosure comprising at least one device and said testing component further testing that said at least one device of said subsystem can be accessed through said first loop and said second loop, said testing component further checking that said at least one device of said enclosure is detected, wherein each device of said enclosure and each device of said subsystem is a disk drive and said first and second interface connections of said subsystem are FC-AL interface connections of a last device, and said subsystem and said enclosure each comprises first and second controllers and said first and second interface connections of said enclosure are FC-AL interface connections of the first and second controllers of the enclosure.

15. A system for reducing incidence of errors in a redundant path system during a process of attachment of an enclosure to a running subsystem, the system comprising:

a subsystem comprising a first FC-AL interface connection and a second FC-AL interface connection;

an enclosure comprising one or more disk drives connected to a first FC-AL interface connection and a second FC-AL interface connection on said enclosure;

a first FC-AL cable connecting said first interface connection of said subsystem to said first interface connection of said enclosure;

a second FC-AL cable connecting said second interface connection of said subsystem to said second interface connection of said enclosure;

a control component for encapsulating said process of attachment of said enclosure enclosure to said subsystem via a first loop comprising said first cable connected between said first interface connection of said enclosure and said first interface connection of said subsystem and a second loop comprising said second cable connected between said second interface connection of said enclosure and a second interface connection of said subsystem;

a disabling component for disabling said first interface connection of said subsystem and said second interface connection of said subsystem as unused connections;

a re-enabling component enabling said first interface connection of said subsystem;

a testing component for testing for the presence of a usable data path across said first interface connection of said subsystem to said enclosure;

said re-enabling component re-enabling said second interface connection of said subsystem;

said testing component testing for the presence of a usable data path across said first interface connection and said second interface connection of said subsystem to said enclosure; and an enabling component for enabling said first interface connection and said second second interface connection of said subsystem to accept communication with said enclosure responsive to a positive outcome from said testing component, wherein said control component permits operation after attachment of said enclosure only if full redundancy is retained.

16. The system of claim 15, further comprising an operator warning component to warn an operator that an expansion of said usable data path cannot be successful responsive to a negative result from said testing component.

17. The system of claim 15, further comprising a termination component for terminating said attachment process responsive to a negative result from said testing component.

18. The system of claim 15, said enclosure comprising at least one device and said testing component further testing that said at least one device of said subsystem can be accessed through said first loop and said second loop and said testing component further checking that said at least one device of said enclosure is detected.

19. The system of claim 18, wherein each device of said enclosure and each device of said subsystem is a disk drive and said first and second interface connections of said subsystem are FC-AL interface connections of a last device.

20. The system of claim 19, wherein said subsystem and said enclosure each comprises first and second controllers and said first and second interface connections of said enclosure are FC-AL interface connections of the first and second controllers of said enclosure.

21. A method for reducing incidence of errors in a redundant path system during a process of attachment of an enclosure to a running subsystem, comprising the steps of:

encapsulating, by a control component, said process of attachment of said enclosure to said running subsystem via a first loop comprising a first FC-AL cable connected between a first FC-AL interface connection of said enclosure and a first FC-AL interface connection of said subsystem and a second loop comprising a second FC-AL cable connected between a second FC-AL interface connection of said enclosure and a second FC-AL interface connection of said subsystem;

disabling, by use of a controller, said first interface connection of said subsystem and said second interface connection of said subsystem as unused connections;

enabling, by use of said controller, said first interface connection of said subsystem;

testing, by use of said controller, for the presence of a usable data path across said first interface connection of said subsystem to said enclosure;

re-enabling, by use of said controller, said second interface connection of said subsystem;

testing, by use of said controller, for the presence of a usable data path across said first interface connection and said second interface connection of said subsystem to said enclosure; and enabling, by use of said controller, said first interface connection and said second interface connection of said subsystem to accept communication with said enclosure responsive to a positive outcome from said testing component; wherein said control component permits operation after attachment of said enclosure only if full redundancy is retained.

22. The method as claimed in claim 21, further comprising a step of warning an operator that an expansion of said usable data path cannot be successful responsive to a negative result from said step of testing.

23. The method as claimed in claim 21, further comprising a step of terminating an attachment process responsive to a negative result from said step of testing.

24. The method of claim 21, said enclosure comprising at least one device and the method further testing that said at least one device of said subsystem can be accessed through said first loop and said second loop and checking that said at least one device of said enclosure is detected.

25. The method as claimed in claim 24 wherein each device of said enclosure and each device of said subsystem is a disk drive and said first and second interface connections of said subsystem are FC-AL interface connections of a last device.

26. The method as claimed in claim 25 wherein said subsystem and said enclosure each comprises first and second controllers and said first and second interface connections of said enclosure are FC-AL interface connections of the first and second controllers of said enclosure.

27. A storage medium storing program instructions executed by a computer system to reduce incidence of errors in a redundant path system during a process of attachment of an enclosure to a running subsystem by performing the steps of:

encapsulating, by a control component, said process of attachment of said enclosure to said running subsystem via a first loop comprising a first FC-AL cable connected between a first FC-AL interface connection of said enclosure and a first FC-AL interface connection of said subsystem and a second loop comprising a second FC-AL cable connected between a second FC-AL interface connection of said enclosure and a second FC-AL interface connection of said subsystem;

disabling said first interface connection of said subsystem and said second interface connection of said subsystem as unused connections;

enabling, by use of said controller, said first interface connection of said subsystem:

testing for the presence of a usable data path across said first interface connection of said subsystem to said enclosure;

re-enabling said second interface connection of said subsystem;

testing for the presence of a usable data path across said first interface connection and said second interface connection of said subsystem to said enclosure; and enabling said first interface connection and said second interface connection of said subsystem to accept communication with said enclosure responsive to a positive outcome from said testing component; wherein said control component permits operation after attachment of said enclosure only if full redundancy is retained.

28. The storage medium as claimed in claim 27, further comprising a program step of warning an operator that an expansion of said usable data path cannot be successful responsive to a negative result from said step of testing.

29. The storage medium as claimed in claim 27, further comprising a program step of terminating an attachment process responsive to a negative result from said step of testing.

30. The storage medium of claim 27, said enclosure comprising at least one device and the computer system further testing that said at least one device of said subsystem can be accessed through said first loop and said second loop and checking that said at least one device of said enclosure is detected.

31. The storage medium as claimed in in claim 30 wherein each device of said enclosure and each device of said subsystem is a disk drive and said first and second interface connections of said subsystem are FC-AL interface connections of a last device.

32. The storage medium as claimed in claim 31 wherein said subsystem and said enclosure each comprises first and second controllers and said first and second interface connections of said enclosure are FC-AL interface connections of the first and second controllers of said enclosure.

33. An apparatus for reducing incidence of errors in a redundant path system during a process of attachment of an enclosure to a running subsystem, the apparatus comprising:

means for encapsulating, by a control component, said process of attachment of said enclosure to said running subsystem via a first loop comprising a first FC-AL cable connected between a first FC-AL interface connection of said enclosure and a first FC-AL interface connection of said subsystem and a second loop comprising a second FC-AL cable connected between a second FC-AL interface connection of said enclosure and a second FC-AL interface connection of said subsystem;

means for disabling said first interface connection of said subsystem and said second interface connection of said subsystem as unused connections;

means for enabling said first interface connection of said subsystem;

means for testing for the presence of a usable data path across said first interface connection of said subsystem to said enclosure;

means for re-enabling said second interface connection of said subsystem;

the testing means further testing for the presence of a usable data path across said first interface connection and said second interface connection of said subsystem to said enclosure;

means for enabling said first interface connection and said second interface connection of said subsystem to accept communication with said enclosure responsive to a positive outcome from said testing component, wherein said control component permits operation after attachment of said enclosure only if full redundancy is retained;

means for warning an operator that an expansion of said usable data path cannot be successful responsive to a negative result from said step of testing; and     means for terminating an attachment process responsive to a negative result from said step of testing.

34. The apparatus of claim 33, said enclosure comprising at least one device and said testing means further testing that said at least one device of said subsystem can be accessed through said first loop and said second loop, said testing means further checking that said at least one device of said enclosure is detected, wherein each device of said enclosure and each device of said subsystem is a disk drive and said first and second interface connections of said subsystem are FC-AL interface connections of a last device, and said subsystem and said enclosure each comprises first and second controllers and said first and second interface connections of said enclosure are FC-AL interface connections of the first and second controllers of the enclosure.

\* \* \* \* \*